(12) United States Patent
Balinsky et al.

(10) Patent No.: US 9,552,337 B2
(45) Date of Patent: Jan. 24, 2017

(54) WORKFLOW AUTOMATION AT A MULTIFUNCTION PRINTER VIA A COMPOSITE DOCUMENT

(71) Applicant: HEWLETT-PACKARD DEVELOPMENT COMPANY, L.P., Houston, TX (US)

(72) Inventors: Helen Balinsky, Cardiff (GB); Andrew M. Spencer, Eagle, ID (US); Nassir Mohammad, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/787,079

(22) PCT Filed: Apr. 30, 2013

(86) PCT No.: PCT/US2013/038963
§ 371 (c)(1),
(2) Date: Oct. 26, 2015

(87) PCT Pub. No.: WO2014/178857
PCT Pub. Date: Nov. 6, 2014

(65) Prior Publication Data
US 2016/0110320 A1    Apr. 21, 2016

(51) Int. Cl.
*G06F 3/12*    (2006.01)
*G06F 17/22*    (2006.01)
(Continued)

(52) U.S. Cl.
CPC ......... *G06F 17/2229* (2013.01); *G06F 3/1275* (2013.01); *G06F 21/60* (2013.01);
(Continued)

(58) Field of Classification Search
None
See application file for complete search history.

(56) References Cited

U.S. PATENT DOCUMENTS

| 6,571,293 B1 | 5/2003 | Hong |
| 7,529,863 B2 | 5/2009 | MacKay et al. |
| (Continued) | | |

OTHER PUBLICATIONS

Balinsky, Helen Y. et al., "Differential access for publicly-posted composite documents with multiple workflow participants", ACM Symposium on Document Engineering. 2010. pp. 115-124. See abstract; p. 116.

(Continued)

*Primary Examiner* — Dung Tran
(74) *Attorney, Agent, or Firm* — HP Inc. Patent Department

(57) ABSTRACT

A composite document comprises a publicly posted composite document including a plurality of parts, a map-file for each participant in a workflow associated with the composite document, and a set of encryption keys. The encryption keys are associated with at least one of the plurality of parts and distributed via the map file to the participants. At least one of the parts of the composite document, associated with the encryption keys, includes workflow processing instructions. The workflow processing instructions are enactable by the multifunction printer independent of a server and automate at east some steps of the workflow for participant at the multifunction printer via resident functions of the multifunction printer.

15 Claims, 6 Drawing Sheets

(51) Int. Cl.
  *G06F 21/60* (2013.01)
  *H04N 1/32* (2006.01)
  *H04N 1/387* (2006.01)

(52) U.S. Cl.
  CPC ......... *H04N 1/32272* (2013.01); *H04N 1/387* (2013.01); *H04N 2201/0094* (2013.01); *H04N 2201/3281* (2013.01)

(56) References Cited

U.S. PATENT DOCUMENTS

| | | | |
|---|---|---|---|
| 7,542,160 B2 | 6/2009 | Parry et al. | |
| 7,710,590 B2* | 5/2010 | de Beus | G06Q 10/10 358/1.15 |
| 7,853,039 B2* | 12/2010 | Hirabayashi | G06Q 10/06 382/100 |
| 7,916,327 B2 | 3/2011 | Yamaguchi | |
| 7,933,924 B2* | 4/2011 | Karlsson | G06F 21/6218 707/783 |
| 7,978,374 B2* | 7/2011 | Kawara | G06F 3/1214 358/1.11 |
| 8,601,276 B2* | 12/2013 | Simske | H04L 9/0825 707/758 |
| 8,972,747 B2* | 3/2015 | Simske | G06F 21/6209 713/189 |
| 8,984,298 B2* | 3/2015 | Balinsky | H04L 9/088 713/168 |
| 2003/0217264 A1* | 11/2003 | Martin | G06F 21/6209 713/156 |
| 2009/0125360 A1* | 5/2009 | Ito | G06Q 10/0633 705/7.27 |
| 2010/0153167 A1* | 6/2010 | Kretzschmar | G06Q 10/00 715/229 |
| 2010/0238489 A1 | 9/2010 | Meyerhofer et al. | |
| 2012/0320408 A1 | 12/2012 | Evevsky | |
| 2013/0031366 A1 | 1/2013 | Simske et al. | |
| 2013/0031369 A1* | 1/2013 | Balinsky | G06F 21/6209 713/176 |
| 2013/0246799 A1* | 9/2013 | Balinsky | G06F 21/6209 713/176 |
| 2016/0077776 A1* | 3/2016 | Balinsky | G06F 3/1222 358/1.14 |

OTHER PUBLICATIONS

Balinsky, Helen et al., "Premature silent workflow termination in publicly posted composite documents", 2011 IEEE International Conference on Systems, Man, and Cybernetics (SMC), pp. 1292-1297. (Oct. 12, 2011) See abstract; p. 1293.

Bent K. Lexmark: New 'Smart' MFPs Are A Product And A Platform (Web Page), Nov. 16, 2012.

International Searching Authorty, The International Search Report and the Written Opinion, Jan. 29, 2014, 14 Pages.

* cited by examiner

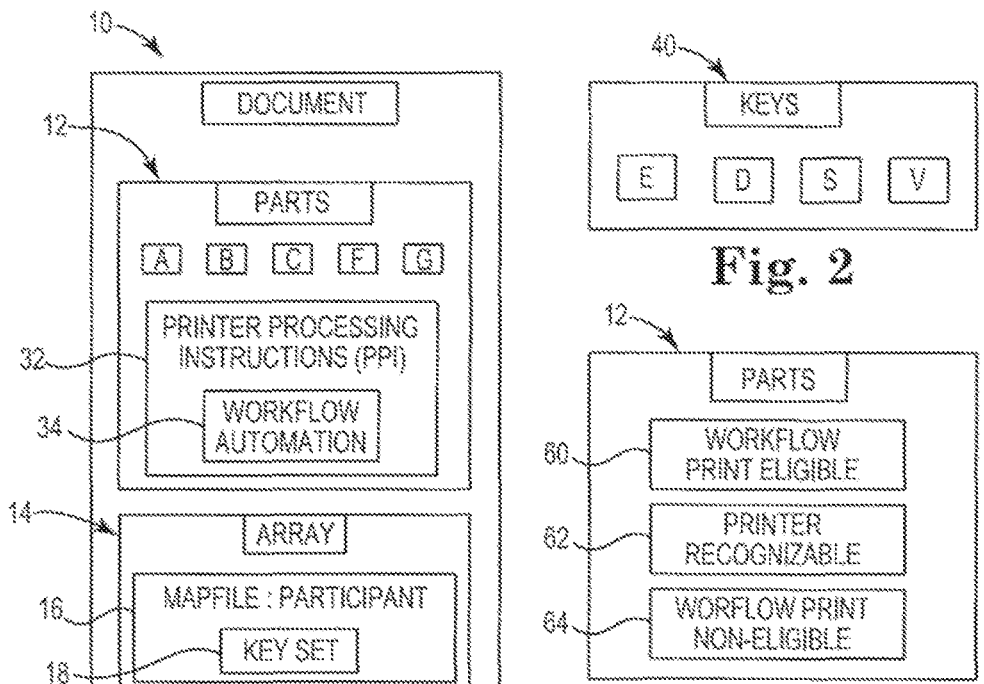

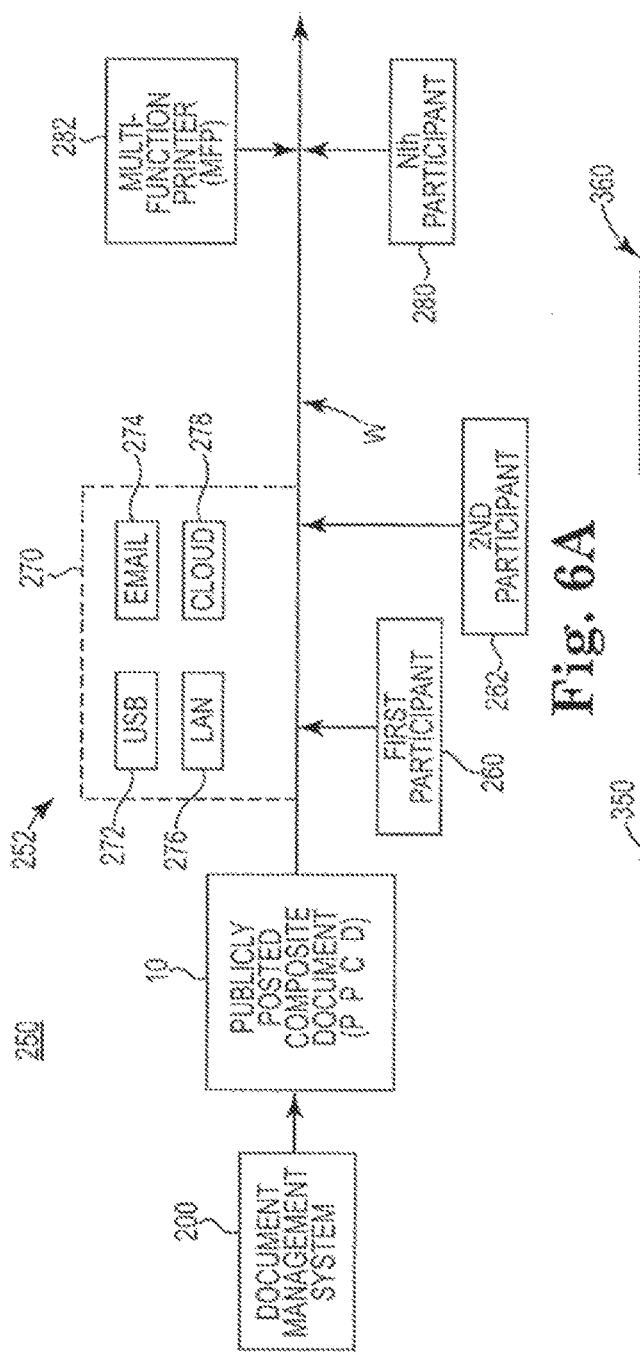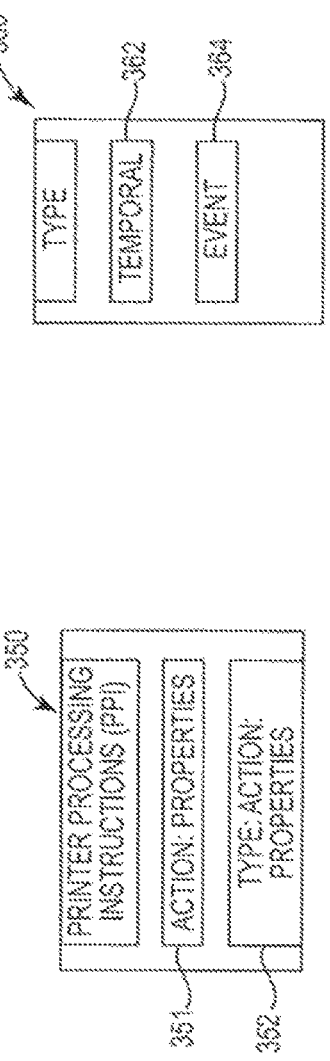

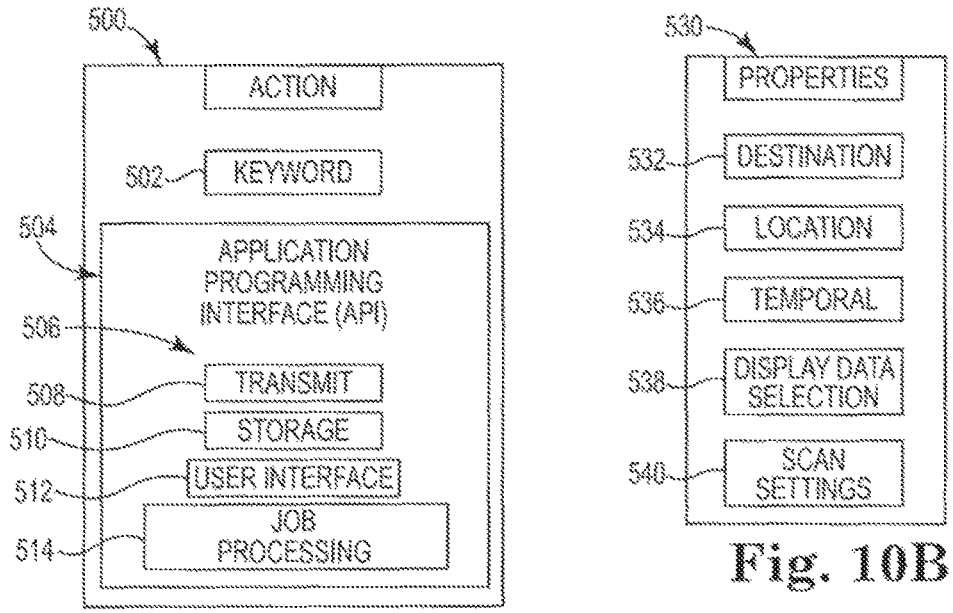
Fig. 10A
Fig. 10B
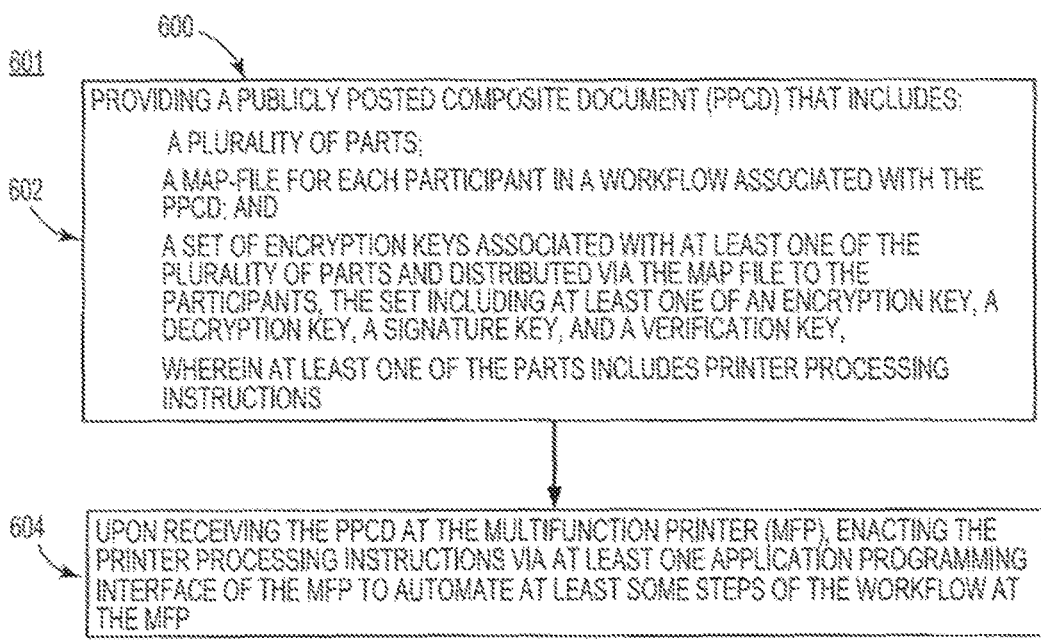
Fig. 11

WORKFLOW AUTOMATION AT A MULTIFUNCTION PRINTER VIA A COMPOSITE DOCUMENT

BACKGROUND

With the advent of the information age, the volume of documents that have been created, stored, communicated has grown dramatically, while the complexity and variety of different types of documents has experienced equally robust growth. Furthermore, documents are often no longer used as unitary elements that are native to their specific formats. Instead, a typical use, e.g. a presentation, often involves using documents of a variety of different formats e.g. portable document file, word processor file, spreadsheet file, slide presentation file, portable audio file, video file, etc. These documents can be gathered together to represent a collection of documents, which we call a composite document. The secure creation, management, use, monitoring and disposal of such documents are a significant part of enterprise document lifecycles.

BRIEF DESCRIPTION OF THE DRAWINGS

FIG. 1 is a block diagram schematically illustrating a composite document, according to one example of the present disclosure.

FIG. 2 is a block diagram schematically illustrating a set of encryption keys, according to one example of the present disclosure.

FIG. 3 is a block diagram schematically illustrating example parts of a composite document, according to one example of the present disclosure.

FIG. 4 is a block diagram schematically illustrating a diagram regarding differential access to parts of a composite document, according to one example of the present disclosure.

FIG. 6A is a diagram schematically illustrating a workflow, according to one example of the present disclosure.

FIG. 6B is a block diagram schematically illustrating a printer processing instruction, according to one example of the present disclosure.

FIG. 6C is a block diagram schematically illustrating a type component associated with a printer processing instruction, according to one example of the present disclosure.

FIG. 10A is a block diagram schematically illustrating an action component associated with a printer processing instruction, according to one example of the present disclosure.

FIG. 10B is a block diagram schematically illustrating a properties component associated with a printer processing instruction, according to one example of the present disclosure.

FIG. 11 is a flow diagram schematically illustrating a method of automating participant workflow at a multifunction printer, according to one example of the present disclosure.

DETAILED DESCRIPTION

Figure 5A:
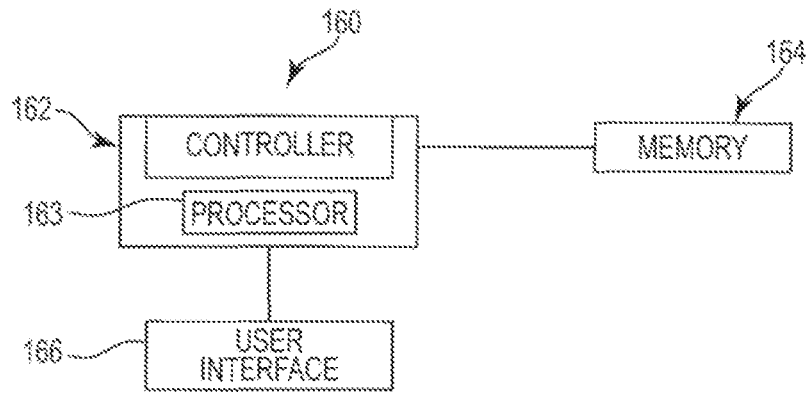
FIG. 5A is a block diagram schematically illustrating a control portion, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure at least partially automate workflow at a multifunction printer by guiding a workflow participant through portions of the workflow and/or by the multifunction printer acting as a workflow participant to execute some of the actions that might otherwise ordinarily be performed by a human participant. In doing so, at least some examples of the present disclosure take advantage of the structure and security of publicly-posted composite documents (PPCDs) by embedding workflow processing instructions into the PPCDs. In one aspect, the embedded workflow processing instructions increase compliance and/or effectiveness of the human participants in the workflow.

In at least some examples of the present disclosure, a composite document comprises a PPCD including a plurality of parts, at least one map-file for each participant in a workflow associated with the composite document, and a set of encryption and signature keys embedded in each corresponding map file. Individual keys are associated with each of the plurality of parts. At least one of the parts of the composite document includes workflow processing instructions or printer processing instructions (PPI).

In one aspect, the workflow processing instructions are enactable by the multifunction printer to automate at least some tasks that would otherwise be performed by a human participant at the multifunction printer, or to guide the human participant through the tasks, by employing resident functions of the multifunction printer.

In another aspect, access to the workflow processing instructions is limited to assigned, credentialed multifunction printer(s) while access is excluded for other, non-assigned multifunction printers lacking credentials.

In some examples, the full set of all encryption keys provides full access to the PPCD. A subset of the full set of keys provides for a partial access to at least one part the document, depending on which key or keys are provided. Each workflow participant is provided with a set or subset of the keys that correspond to the level of access assigned to that particular participant. In one aspect, each "assigned" multifunction printer is also considered to be a workflow participant and therefore, is provided with a subset or full set of keys.

At least some examples of the present disclosure dramatically decrease a participant's time spent at a multifunction printer to accomplish their assigned workflow tasks and/or dramatically increase the effectiveness of the overall workflow.

In another aspect, some types of potential human errors are eliminated while performing tasks at the multifunction printer. Some examples of human errors overcome via at least some examples of the present disclosure include: a) missing or forgetting to perform some workflow steps, such as forgetting to upload a copy of a scanned document to organization's record management system; and b) mistyping document destination information, such as sending a document from a multifunction printer to a wrong destination.

In another aspect, via at least some examples of the present disclosure, many workflow tasks have been automated and thereby save the user from tedious user input through a device's control panel.

For example, many times after a workflow participant prints a document, they also send the document via email to another person. In a traditional workflow, the participant is expected to affirmatively take several actions to do so. First, the participant is expected to remember to email the document to another person, to remember the email address, and to correctly type the email address into the control panel at the multifunction printer. Even if the email address is conveniently already in a directory accessible via the multifunction printer, the participant typically has to make several key strokes to find the desired email address and properly select that email address while avoiding an inadvertent selection of an adjacent email address.

However, via at least some examples of the present disclosure, many of these actions are already automated via the printer processing instructions that are already embedded within the PPCD. Accordingly, upon enactment of the printer processing instructions at the multifunction printer, many actions formerly performed by a workflow participant are now performed by the multifunction printer and/or made simpler by the multifunction printer.

For example, in the case where the workflow indicates that the participant is to send (via email) a signed document to another individual, the printer processing instructions already would have the correct email address (for the intended recipient) securely embedded into the PPCD to enable the email to be retrieved. Accordingly, the participant would be saved from the effort of typing in the intended recipient's email address and there would be no chance of selecting the wrong email address or mistyping the email address, and the participant will not need to remember to send the document and thus will not forget to do so.

Moreover, upon completion of the participant's tasks, the workflow at the multifunction printer would automatically initiate sending the email to the intended recipient, thereby avoiding a chance that the participant would forget to do so, or intentionally not do so. In addition, upon completion of sending the email, the multifunction printer can automatically send a notification to others (besides the individual) in the workflow indicating that the email was sent to the intended recipient, such that the system operating the workflow does not have to rely on the individual's memory or willingness to do so.

Because it is known to those establishing the workflow that these actions will be taking place as well as knowing who the participants are, where they are located, etc., the efficiency and effectiveness of the workflow is greatly enhanced by embedding within the PPCD the printer processing instructions to automatically perform (or automatically elicit) such actions associated with an individual participants role in the workflow.

It will be understood that the foregoing examples of enhanced workflow, via at least some examples of the present disclosure, are merely representative of just some of the types of automated workflow produced via printer processing instructions embedded within the PPCD. Rather, many other aspects of enhanced workflow occur via at least some examples of the present disclosure, some of which are described and/or illustrated below.

Accordingly, these examples, and additional examples, are further described and illustrated in association with at least FIGS. 1-11.

FIG. 1 is a block diagram schematically illustrating a publicly-posted composite document (PPCD) 10, according to one example of the present disclosure. As shown in FIG. 1, the PPCD 10 includes a plurality of parts 12 (such as parts A, B, C, etc.) and at least one map-file 16 for each participant in a workflow associated with the composite document. In one aspect, with multiple participants in a workflow, and with one map-file for each participant, the PPCD 10 includes an array 14 of map-files 16. In another aspect, each map-file 16 includes a keyset 18 corresponding to the level of access assigned to that particular participant for a particular part (A, B, C, F, C, etc.) of the PPCD 10.

In some examples, the keyset 18 includes a full set of encryption keys, a subset of encryption keys, or no encryption keys.

FIG. 2 represents the encryption keys that can form part of keyset 18 (FIG. 1). As shown in FIG. 2, in one example, the keys 40 available to form keyset 18 include an encryption key (E), a decryption key (D), a signature key (S), and a verification key (V), with the particular set of keys (i.e. keyset 18) associated with a map-file 16 depending upon the level of access granted to that particular participant for a particular part of the PPCD 10.

In some examples, in the context of a workflow associated with a PPCD 10, differential access is provided among multiple workflow participants and provided for parts of a PPCD 10 via at least the array 14 of map files 16 and encryption keys. In some examples, such differential access is implemented via at least some of the features and attributes as the differential access, map files, and encryption keys for PPCDs, as previously described and illustrated in association with: *Differential Access for Publicly-Posted Composite Documents with Multiple Workflow Participants*, (Proceeding, Doc Eng'10, Proceedings of the 10$^{th}$ ACM Symposium on Document Engineering, Pages 115-124, ACM, New York, N.Y. ©2010).

As further shown in FIG. 1, at least one of the parts 12 includes printer processing instructions 32, which are enactable by a multifunction printer. The printer processing instructions 32, when enacted by the multifunction printer, automate at least some steps of a workflow (as represented by workflow automation indicator 34) at the multifunction printer via resident functions of the multifunction printer.

In some examples, the multifunction printer enacts the printer processing instructions without the assistance of and/or without receiving commands from, a server, at least because the instructions are provided via the PPCD 10. Accordingly, the multifunction printer enacts the printer processing instructions independent of a server, i.e. without a server.

In one aspect, access to the printer processing instructions is available to assigned multifunction printers for which credentials are established and access is prevented (to the printer processing instructions) for non-assigned, non-credentialed multifunction printers. Accordingly, the printer processing instructions will not be enactable by those non-assigned, non-credentialed multifunction printers.

In some examples, within this framework, each PPCD 19 includes a job identifier and a signature to ensure that execution is limited to authorized print jobs.

FIG. 3 is a block diagram schematically illustrating parts of a PPCD 10, according to one example of the present disclosure. At least for purposes of employing printer processing instructions in at least some examples of the present disclosure, and as shown in FIG. 3, parts 12 of the PPCD 10 include at least a workflow print eligible part 60 and a workflow print non-eligible part 64. In general terms, each workflow print eligible part 60 corresponds to printer recognizable file formats 62, i.e. file formats that the multifunction printer is equipped to recognize and handle. In one aspect, this ensures that the multifunction printer is equipped to enact the printer processing instructions, which aim to utilize resident functionalities of the multifunction printer. In some examples, the workflow print eligible part(s) 60 of a PPCD 10 include, but is not limited to, at least one of a printable format of a text or word processor file, a spreadsheet, an image file (e.g. JPEG, PNG, etc.), a hypertext markup language (HTML) file, a portable document format (PDF) file, a Printer Command Language (PCL) file, a Postscript (PS) file, etc.

In general terms, the workflow print non-eligible part(s) 64 of the PPCD 10 are not printable at the multifunction printer (at least for the particular state in which the PPCD 10 arrives at the multifunction printer) and need not have a file format recognizable by the multifunction printer. Accordingly, the workflow print non-eligible part(s) 64 are generally unrestricted regarding their file format. Workflow print non-eligible parts can be handled on the device as part of a composite document that are intended for printing.

In some examples, the print processing instructions comprise a "workflow print non-eligible" part 64 of the PPCD 10 because they will not be printed at the multifunction printer.

In some examples, the part of the PPCD 10 that contains printer processing instructions 32 is a text-based file, and is expressed in a comma-separate values (CSV) file, XML, or other pre-defined format suited to providing printer processing instructions in a manner consistent with at least some examples of the present disclosure, in one example, the printer processing instructions 32 (FIG. 1) comprise a string including at least one non-executable keyword component, as further described later in association with at least FIG. 6B, in some examples, the string takes the form of a metadata structure.

FIG. 4 is a diagram schematically illustrating a table 100 that represents differential access among multiple workflow participants to different part(s) of the PPCD 10, according to one example of the present disclosure. As shown in FIG. 4, in some examples, table 100 includes rows 102 listing different workflow participants 111, 112, 113, 114 and columns 104 listing different parts (A, B, C, F, G, H) of a PPCD 10. For any given workflow participant and any given part, table 100 expresses the type of access (No Access, Read Only Access, and Modify Access) granted. In addition, table 100 expresses which keys implement that level of access. For example, as expressed in Table 100, a Read Only Access corresponds to the subset of keys including a verification key (V) and a decryption key (D). Meanwhile, a Modify Access corresponds to the full set of keys including an encryption key (E), decryption key (D), a signature key (S), and a verification key (V). In this way, table 100 represents the manner in which map-files establish the differential access that the workflow participants 111, 112, 113, 114 have to various part(s) A, B, C, F, G, H of the PPCD 10.

In at least some examples, as shown in Table 100 of FIG. 4, one workflow participant 114 includes or is defined by a multifunction printer and one part of the PPCD 10 includes or is defined by printer processing instructions (PPI) enactable by the same multifunction printer 114. In one aspect, such a multifunction printer can be referred to as a MFP workflow participant 114.

In some examples, as expressed in Table 100, a Read Only Access is provided to the MFP workflow participant 114 at least because the printer processing instructions (PPI) are not changeable by the multifunction printer 114 yet the multifunction printer 114 will access them to be able to enact the printer processing instructions as part of the desired workflow. Details regarding the mechanics of such authentication and/or enactment by the MFP workflow participant) of the printer processing instructions are further described later in association with at least FIGS. 6A-11. Moreover, the manner in which the MFP workflow participant generally participates in the work flow also will be further described later in association with at least FIGS. 6A-11.

It will be understood that in at least some examples, a workflow will include multiple multifunction printers with at least some of those multifunction printers acting as workflow participants. In one aspect, the participation of the respective multifunction printers is spaced apart over time and/or distance. In some instances, the workflow will interleave activity of other workflow participants (i.e. humans) between and among the MFP workflow participants.

FIG. 5A is a block diagram schematically illustrating a control portion 160, according to one example of the present disclosure. In some examples, control portion 160 includes a controller 162, a memory 164, and a user interface 166.

In general terms, controller 162 of control portion 160 comprises at least one processor 163 and associated memories that are in communication with memory 164 to generate control signals directing operation of at least some components of the systems and components described throughout the present disclosure. In some examples, these generated control signals include, but are not limited to, automating a workflow at a multifunction printer via printer processing instructions embedded securely within a PPCD 10. In some examples, a control portion 160 is present in the multifunction printer at which the printer processing instructions are enacted and/or at which the multifunction printer acts a workflow participant. In some examples, a control portion 160 is present in a document management system that establishes and facilitates the PPCD 10 and/or its workflow. In some examples, a control portion is present in resources that engage, or that is engaged by, the PPCD 10 along the workflow. Accordingly, as the PPCD 10 moves through variety of secure and non-secure environments as part of its workflow, the PPCD 10 is subject to and/or interacts with at least some portions of a control portion 160.

In particular, in response to or based upon commands received via a user interface 166 and/or machine readable instructions (including software), controller 162 generates control signals to at least partially implement the general workflow in accordance with at least some of the previously described examples and/or later described examples of the present disclosure. In one example, controller 162 is embodied in a general purpose computer while in other examples, controller 162 is embodied in other resources associated with the workflow.

For purposes of this application, in reference to the controller 162, the term "processor" shall mean a presently developed or future developed processor (or processing resources) that executes sequences of machine readable instructions (such as but not limited to software) contained in a memory. In some examples, execution of the sequences of machine readable instructions, such as those provided via memory 164 of control portion 160 cause the processor to perform actions, as operating controller 162 to generate a PPCD 10, enact printer processing instructions, and/or provide and operate portions of a workflow as generally described in for consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium, as represented by memory 164. In one example, memory 164 comprises a computer readable tangible medium providing non-volatile storage of the machine readable instructions executable by a process of controller 162. In other examples, hard wired circuitry may be used in place of or in combination with machine readable instructions (including software) to implement the functions described. For example, controller 162 may be embodied as part of at least one application-specific integrated circuit (ASIC). In at least some examples, the controller 162 is not limited to any specific combination of hardware circuitry and machine readable instructions (including software), nor limited to any particular source for the machine readable instructions executed by the controller 162.

In some examples, user interface 166 comprises a user interface or other display that provides for the simultaneous display, activation, and/or operation of at least some of the various components, functions, features, and of control portion 160, a multifunction printer, and/or other workflow resources, as described throughout the present disclosure. In some examples, at least some portions or aspects of the user interface 166 are provided via a graphical user interface (GUI).

Moreover, it will be understood that the features, functions, modules, and components of the PPCD 10 (including the printer processing instructions) and associated workflow modalities, such as multifunction printer (e.g. multifunction printer 282 in FIG. 6A), as described throughout the disclosure can be arranged in different forms and groupings, and therefore the PPCD 10 (FIG. 1) and various modalities (e.g. multifunction printer 262 in FIG. 6A) are not strictly limited to the particular arrangement or groupings of functions, modules, and components illustrated in FIGS. 1A-10.

Figure 5B:
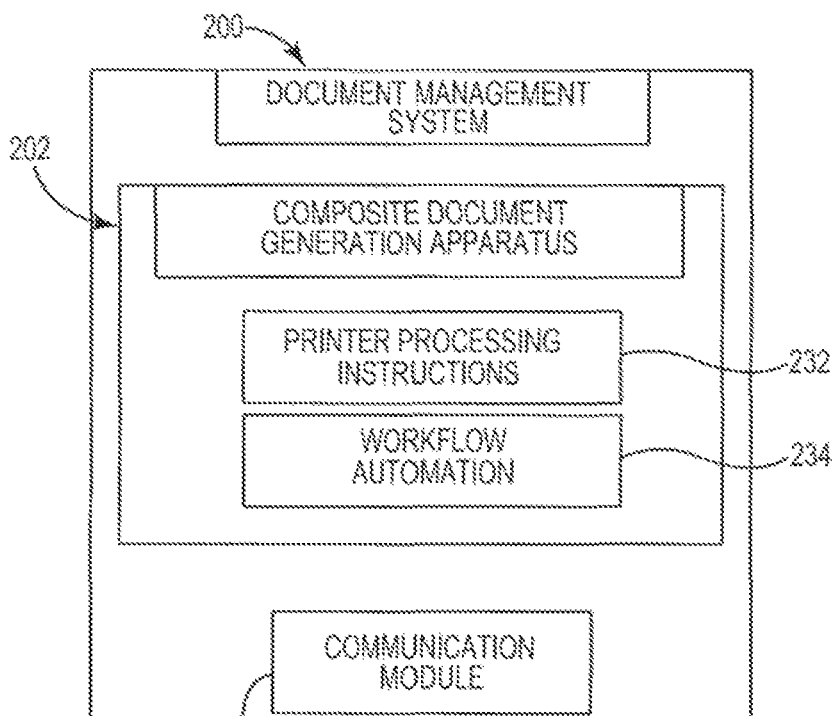
FIG. 5B is a block diagram schematically illustrating a document management system, according to one example of the present disclosure.

FIG. 5B is a block diagram schematically illustrating portions of a document management system 200, according to one example of the present disclosure, storable in memory 164 and operable via a control portion 160 as previously illustrated in association with FIG. 5A. As shown in FIG. 5B, in one example the document management system 200 includes a composite document generation apparatus 202 and a communication module 204. In general terms, the composite document generation apparatus 202 generates PPCDs 10 having at least the characteristics and parameters as those described in association with FIGS. 1-11.

With this in mind, in some examples, composite document generation apparatus 202 generates a PPCD 10 including a plurality of parts with at least a first part including printer processing instructions 232 to at least partially provide for workflow automation 234 for authorized participants at a multifunction printer.

In one aspect, the printer processing instructions 32 are enactable via the multifunction printer without the assistance of a server and/or without receiving commands from a server, thereby providing server-less workflow automation at the multifunction printer.

Moreover, in some examples, to ensure the security of the PPCD 10, at least a portion of the printer processing instructions 232 are non-executable (by a processor) and, at least via their association with the encryption keys, the printer processing instructions 232 are embedded within, and form an inseparable part, of the PPCD 10. In addition, via at least these same protections, the printer processing instructions cannot be altered or eavesdropped. In one aspect, as with other PPCDs, part tables, and all other tables are also signed to enforce authenticity of the document and those signatures are automatically verified by the multifunction printer according to the standard PPCD access protocol In some examples, the communication module 204 is provided to communicate the PPCD 10 externally of the document management system 200 to enter a workflow, which includes but is not limited to, enactment of the printer processing instructions 232 at the multifunction printer, as further described later in association with at least FIG. 6A.

FIG. 6A is a diagram 250 schematically illustrating a workflow environment 252, according to one example of the present disclosure. In one example, workflow environment 252 operates in a manner at least consistent with the PPCD 10 and related elements, as previously described and illustrated in association with FIGS. 1A-5B. As shown in FIG. 6A, the workflow environment 252 includes a document management system 200 that generates a PPCD 10 which enters and at least partially defines a workflow (represented by arrow W). In one aspect, it will be noted that workflow environment 252 does not intend to represent a comprehensive or closed environment, but rather is merely representative of just some examples and aspects in which a workflow can incorporate a PPCD 10 having printer processing instructions (PPI). Furthermore the workflow is not necessarily enclosed in one organization and can cross organizational boundaries, non-secure domains and be transferred over non-secure channels.

As shown in FIG. 6A, as part of the workflow W, authorized participants 260, 262 interact with the PPCD 10 via modalities 270 adapted to transmit, receive, store, and/or manipulate the PPCD 10 with each participant participating to the extent authorized by the document itself. It will be understood that the modalities 270 illustrated in FIG. 6A are merely samples and do not represent the full range of modalities by which a PPCD 10 proceeds along workflow W. A PPCD can be accessed on a laptop, desktop, or other device, USB, EMAIL, LAN and CLOUD can be used as transmission mechanisms. Nevertheless, in some examples, the modalities shown in FIG. 6A include but are not limited to, storage interactions (e.g. USB devices 272), network interactions (e.g. LAN) 276, communication interactions 274 (e.g. email), and cloud-based interactions 278.

As further shown in FIG. 6A, at some point in the workflow W, the PPCD 10 arrives at multifunction printer (MFP) 382. In one aspect, the PPCD 10 includes printer processing instructions (for at least partially automating workflow) that are enactable by the multifunction printer 282 to increase compliance and/or effectiveness of the human participants in the workflow.

As such, the multifunction printer 282 is formally designated as a MFP workflow participant (114 in FIG. 4) and therefore is associated with at least one map-file and a subset of encryption keys to enable the multifunction printer 282 to interact with parts of a PPCD 10. Moreover, it will be recalled that the printer processing instructions comprise one of the parts of the PPCD 10, and therefore are embedded in the PPCD 10 in an encrypted form, as reflected via their presence in Table 100 in FIG. 4.

In one aspect, the multifunction printer 282 is itself a workflow participant that performs actions involving or affecting the PPCD 10 in the workflow W with the printer processing instructions addressing (but not limited to): which actions are to be taken by the multifunction printer, and when and how to take those actions; and/or when, where, and how the multifunction printer will facilitate a human workflow participant to take specified actions in the workflow.

Accordingly, in one aspect, as a workflow participant the multifunction printer 282 acts as a resource by which a participant 280 (a human or another device) can participate in the workflow (W) at the multifunction printer (MFP) as dictated by the printer processing instructions embedded in the PPCD 10.

More specific examples and aspects of the manner in which the printer processing instructions are structured and/or dictate the workflow (W) at the multifunction printer 282 are further described and illustrated in association with at least FIGS. 6B-10B and at least some of the previously described aspects and examples of the present disclosure.

It will be further understood that while PPCD 10 may include a plurality of embedded printer processing instructions, which are defined within a single part or multiple different parts of the PPCD 10, these multiple printer processing instructions all relate to accomplishing the same general workflow W and therefore, the multiple printer processing instructions occur in a coordinated fashion whether they are enacted serially, in parallel, or other pattern.

FIG. 6B is a block diagram schematically illustrating printer processing instructions 350, according to one example of the present disclosure. As shown in FIG. 6B, in some examples, each printer processing instruction (PPI) 350 comprises a structure, such as a text-based string 351 including at least an action component and a properties component, which are further described later in association with at least FIGS. 10A and 10B. In some examples, the part of the PPCD 10 that contains printer processing instructions 32 is a text-based file, and is expressed in a comma-separate values (CSV) file, XML, or other pre-defined format suited to providing printer processing instructions in a manner consistent with at least some examples of the present disclosure. In one example, the printer processing instructions 350 include at least some of substantially the same features and attributes as the printer processing instructions 32 (FIG. 1A), 232 (FIG. 5B), as previously described in association with at least FIGS. 1-6B. It will be further understood that in at least some examples, the PPCD 10 includes multiple printer processing instructions 350.

In some examples, as further shown in FIG. 6B, the string 352 that at least partially defines the printer processing instructions 32, 232 further includes a type component, which is further described and illustrated in association with FIG. 6C.

In one example, a representative structure of one printer processing instruction (that includes a type component, an action component, and a properties component) can appear as a string, such as "on-completion$$upload document$$\\record-management.hp.com". In one example, the string defines a metadata structure within the PPCD 10.

In one example, this printer processing instruction is enactable by the multifunction printer and dictates that upon completion of an earlier action(s) ("on-completion"—a TYPE), the document will be uploaded ("upload_document"—an ACTION) to a specified destination ("record-management.hp.com"—a PROPERTY). Finally, it will be understood that this example string is merely representative of a wide variety of types, actions, and properties that can define printer process instructions (PPI) as part of at least partially automating a workflow in at least some examples of the present disclosure. As a result of such instruction, when the participant accomplishes their task at the multifunction printer (e.g. prints some document parts and signs out from the device) a copy of the document is automatically uploaded by the device into the specified destination ("record-management.hp.com" in the above example).

More details regarding the type component, action component, and properties components of a printer processing instruction are provided in association with at least FIGS. 6C-10B.

FIG. 6C is a block diagram schematically illustrating a type component 360 of a printer processing instruction, according to one example of the present disclosure. In one aspect, the type component comprises features and attributes that are at least consistent with previously described examples relating to a type component and/or printer processing instructions.

In general terms, the type component 360 specifies a context in which a respective one of the printer processing instructions will be accessed (via compliance with an access protocol for a PPCD) and enacted at (or by) the multifunction printer. However, in some examples, a printer processing instruction omits a type component, but does include other components, such as an action component and a properties component, which are further described later in association with at least FIGS. 10A-10B.

In one example, as shown in FIG. 6C, the type component 360 comprises at least one of a temporal parameter 362 and an event parameter 364.

Figure 7A:
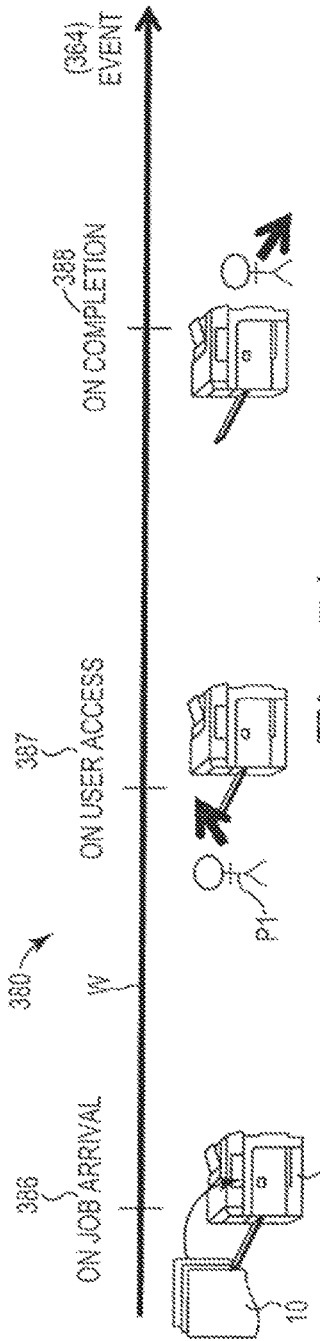
FIG. 7A is a diagram schematically illustrating event-based triggers to enact printer processing instructions, according to one example of the present disclosure.

FIG. 7A is a diagram schematically illustrating implementation of the event parameter 364 of the type component 360 in a workflow W, according to one example of the present disclosure. In some examples, as shown in FIG. 7A, portions 380 of workflow W proceed according to event parameter 364 by which at least some of the printer processing instructions are triggered for execution based on an event involving the multifunction printer 282. While a large variety of different types of events can occur at the multifunction printer involving the PPCD 10, FIG. 7A illustrates just a few representative examples of events. Accordingly, as shown in FIG. 7A, the workflow W includes events 386, 387, 388.

As shown in FIG. 7A, in one example, at least a portion of the workflow W includes the event of the PPCD 10 arriving at the multifunction printer ("ON JOB ARRIVAL" event 386), which is specified via the type component 360 of a printer processing instruction 350. In some examples, upon the arrival of the PPCD 10 at the multifunction printer (i.e. an event), an action component of printer processing instructions dictates that the multifunction printer automatically sends an email to a workflow participant (already designated in the printer processing instructions) informing them of the job arrival. In one example, the email instructs the user to come to the multifunction printer 282 to access the PPCD 10 and participate in the workflow. More comprehensive details regarding the structure and operation of an action component of printer processing instructions are further described later in association with at least FIG. 10A.

Figure 8:
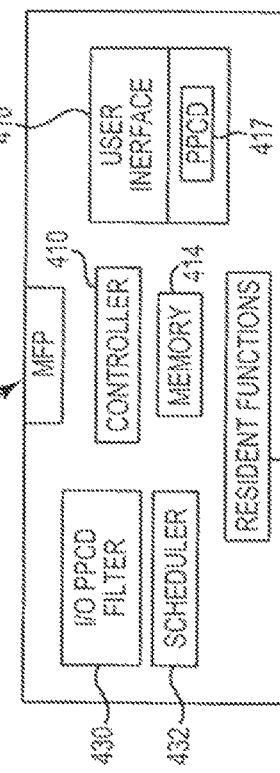
FIG. 8 is a block diagram schematically illustrating a multifunction printer, according to one example of the present disclosure.

In one aspect, with further reference to FIG. 7A, when a PPCD 10 arrives (event 386) at the multifunction printer 282, before a corresponding action takes place (as directed by printer processing instructions), some initial handling steps are taken by the multifunction printer 282. To do so, as shown in FIG. 8, the multifunction printer 400 (282 in FIG. 7A) includes an I/O PPCD Filter 430, which performs initial handling of the incoming PPCD 10 via sorting the PPCD-type files from other types of files.

In some examples, this initial handling includes the I/O PPCD filter 430 authenticating the PPCD 10 and automatically verifying the printer processing instructions. In some examples, the I/O PPCD filter 430 also recognizes any time-based printer processing instructions, which are then decrypted and uploaded to scheduler 432 of multifunction printer (400 in FIG. 8; 282 in FIG. 7A). In one aspect, the PPCD 10 is then stored in a designated directory in the memory 414 of the multifunction printer 400 (FIG. 8), which is a restricted access directory, which in turn is accessible via authentication of the workflow participant at the multifunction printer. The part of the printer processing instructions that are uploaded to scheduler 432 can be removed or otherwise marked as used/deployed.

Accordingly, after the incoming PPCD 10 is sorted from other incoming jobs, and without the parts of the PPCD 10 being engaged directly, the multifunction printer 282 stores the PPCD 10 in the memory 414 of the multifunction printer 400 until the stored PPCD 10 is called for as a portion of the remaining workflow W.

Once the incoming PPCD has been properly handled, a printer processing instruction including an ON ARRIVAL event 486 is enacted at or by the multifunction printer, such as the earlier described example of sending an email to notify a workflow participant that the PPCD 10 has arrived at the multifunction printer. In one aspect, the ON ARRIVAL-type printer processing instructions are immediately enacted upon the multifunction printer automatically and immediately engaging a PPCD access protocol, as will be further described later in association with at least FIG. 9.

With further reference to FIG. 7A regarding the type component of the printer processing instructions, in some examples, a portion of the workflow W includes a participant accessing the PPCD 10 (ON USER ACCESS event 387) via a control panel or user interface 416 of the multifunction printer 400 (FIG. 8). In some examples, the user is present at the user interface 416 because the user was previously prompted via email (see ON JOB ARRIVAL event) of the presence of the PPCD 10 at the multifunction printer 282, and therefore, the user has approached the user interface 416 to participate in the workflow.

On the other hand, one example of the ON USER ACCESS event 387 includes a participant loading the PPCD 10 into the memory 414 (FIG. 8) of the multifunction printer via a USB memory device.

In either case, before a participant can perform workflow tasks involving the PPCD 10, the human participant (as a requester) will engage a PPCD access protocol at user interface 416 of multifunction printer 400, as shown in FIG. 8.

Figure 9:
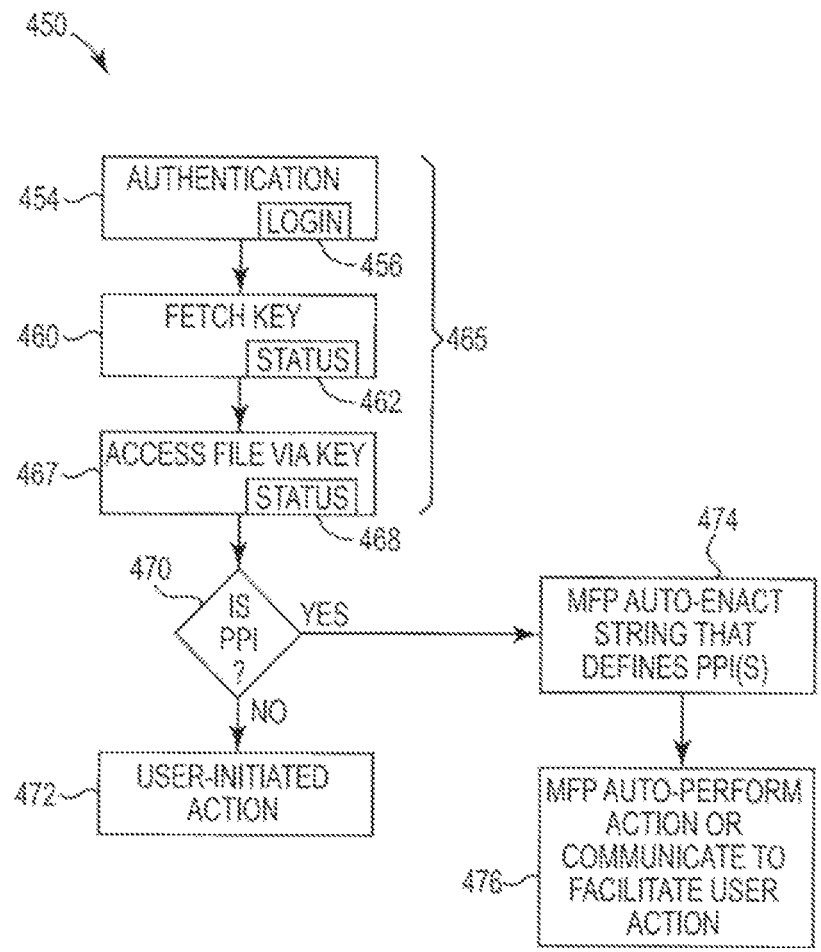
FIG. 9 is a flow diagram schematically illustrating an access protocol, according to one example of the present disclosure.

FIG. 9 is a flow diagram 451 of at least some portions of a PPCD access protocol, according to one example of the present disclosure. This access protocol generally applies either to a multifunction printer as a workflow participant or applies to a human workflow participant that seeks access to parts of the PPCD 10. In short, a requester includes a participant seeking access to a part of a PPCD 10. Accordingly, for discussion purposes at least in association with FIG. 9, either type of participant is referred to as a requester.

As shown in FIG. 9, the PPCD access protocol initiates an authentication 454 that challenges the requester to supply credentials such as username and password as part of a login 456. In one aspect, this authentication 454 is supported by or involves a LDAP server. In some examples, authentication 454 is omitted from the protocol.

If the requester is successfully authenticated, the requester's private keys are fetched as represented at 460. In some examples, access keys are accessed from a portable memory resource, such as a smart card, USB memory device, or local in-device key store.

In the case where the requester is a human participant, a status 462 is reported to the user via a pop-up notification at the user interface 416 regarding whether their private keys have been successfully retrieved and whether such keys will successfully access the part(s) of the PPCD 10.

If the requester's keys are correct, then access is granted to parts of PPCD 10 to which the requester (whether human or MFP) has been assigned keys (Table 100 in FIG. 4). However, if the requester's keys are incorrect, then access is denied to the parts of PPCD 10.

For human requesters, a status 468 of allowed or denied access is reported via a pop-up notification at the user interface 416 in FIG. 8. In some examples, the status regarding allowed or denied access also is communicated (e.g. via email) to others (e.g. supervisor, colleague, etc.) to inform them of an attempted, but denied access or an attempted, successful access. Besides helping to manage a workflow, such status reports enhance security of the PPCD 10.

A process of a multifunction printer, as a requester, accessing a part in the PPCD 10 also follows generally the same steps (authentication, key retrieval and access) as for a human requester except that, with the multifunction printer as a requester, the initial authentication is performed automatically and directly between the multifunction printer and the PPCD 10. As noted above, in some examples authentication 454 is omitted.)

On the other hand, when a human requester engages the PPCD access protocol, at least some manual steps would be performed at the user interface 416 of multifunction printer 400 (282 in FIG. 7A) such as entering a login name and entering a password.

Accordingly, except for some level of automation when the multifunction printer attempts access, the manner in which a human requester or a multifunction printer (as a requester) engages the initial portion 465 of the PPCD access protocol is generally the same.

As further shown in FIG. 9, a query at 417 signals a transition to potential enactment of printer processing instructions. In particular, the case in which the decrypted/accessed part of the PPCD 10 is not a printer processing instruction (PPI) corresponds to a workflow for a human participant. As shown at 472 in FIG. 9, the user can print the document at the multifunction printer or take other available actions (e.g. digital send) according to whatever instructions the user already had in possession about their role in the workflow.

On the other hand, as represented at 474 in FIG. 9, in the case where the decrypted/accessible part of the PPCD 10 is a printer processing instruction (PPI), then the multifunction printer automatically enacts the printer processing instruction(s) 350.

Having set forth some of the mechanics of securely accessing printer processing instructions before enacting the printer processing instructions, additional examples are provided regarding the features and attributes of the ON ACCESS event 387 of type component 360 of a printer processing instruction.

In some examples, the action component of the particular printer processing instructions call for the multifunction printer to communicate to the human workflow participant which workflow tasks to perform. In one example, the PPCD 10 includes placeholders for insertion of documents to be scanned by the workflow participant. Accordingly, via the ON USER ACCESS event 387, upon the user accessing the PPCD 10, one action includes prompting (at the user interface 416 in FIG. 8 or via email notification) the participant to obtain or supply a document and then scan that document at the multifunction printer. For example, if the workflow involved financial matters such as a mortgage application, the pop-up notification would instruct the user retrieve a copy of their W2 yearly income record and scan that W2 record, which then automatically becomes a part of the PPCD 10. In other words, the PPCD 10 automatically directs the multifunction printer to integrate the scanned document into the PPCD 10 at the placeholder.

In one example, the workflow is further automated by instructing the user to authorize the MFP to append a digital signature (available from the memory 414 of the MFP) to the PPCD 10. This action avoids traditional cumbersome process of the user printing a document, physically signing it, and the scanning the document.

In some examples, the multifunction printer will be notified anytime that a signature is called for on a document (from a part of the PPCD 10) so that the multifunction printer can automatically add the users digital signature to the PPCD 10, after timely engagement with the PPCD access protocol.

In one example, via the ON ACCESS event 387 in the printer processing instructions, upon the user accessing the PPCD 10, user interface 216 causes a pop-up notification displaying a listing of the parts or subparts of PPCD 10 for which the user can initiate an action at the multifunction printer, such as requesting printing.

As a general matter, and also applicable specifically regarding an ON ACCESS event associated with a printer processing instruction, full decryption does not take place until just before the specified action will be taking place. This timing helps to maintain security over the printer processing instructions and/or the contents of the PPCD 10 itself and part of the PPCD 10 being handled at or by the multifunction printer at that time.

FIG. 7A further schematically illustrates a further type component of a printer processing instruction, namely an ON COMPLETION event 388, according to one example of the present disclosure.

In one example, with further reference to FIG. 7A, an ON COMPLETION event 388 occurs upon a participant meeting a workflow milestone established by the printer processing instructions. For example, the milestone could be completion of all requested actions for a particular participant or for that multifunction printer (when it acts as a workflow participant). For example, a few representative sample milestones could include a participant scanning all requested documents, adding all requested electronic signatures, and/or sending the updated PPCD 10 to a particular addressee. Additional examples of actions associated with an ON COMPLETION-type event are further described later in association with at least FIGS. 10A, 10B.

Figure 7B:
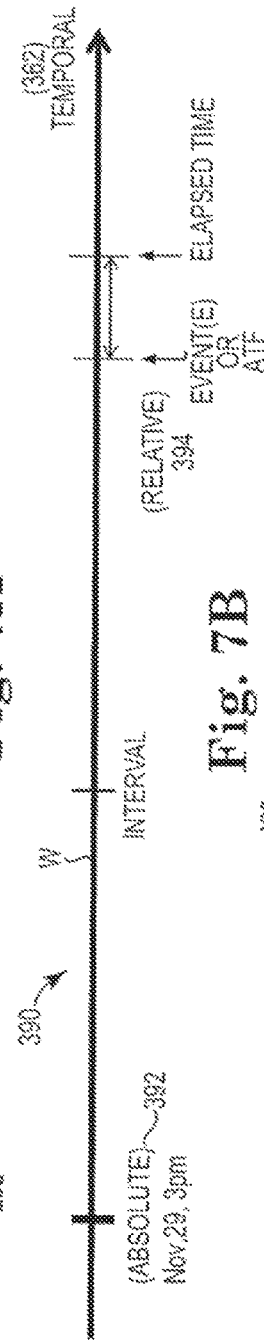
FIG. 7B is a diagram schematically illustrating temporal-based triggers to enact printer processing instructions, according to one example of the present disclosure.

FIG. 7B is a diagram of a portion of a workflow W in association with the temporal parameter 362 of the type component 360 of a printer processing instruction, according to one example of the present disclosure, in one example, as further shown in FIG. 7B, portion 390 of workflow W proceeds according to temporal parameter 362 in which at least some of the printer processing instructions are enacted based on temporal factors.

In particular, as shown in FIG. 7B, in one example, at least a portion of the workflow W is automatically executed or triggered based on an absolute time factor (ABSOLUTE factor 392) such as (but not limited to) a time of day, day of the week, time and date, etc. In some examples, this ABSOLUTE factor exhibits a repeating behavior such as a time/day occurring each week, which is represented by the indicator INTERVAL. In some examples, the ABSOLUTE factor occurs a single time for a given PPCD 10 or for a given multifunction printer.

Accordingly, when the particular temporal occasion occurs (per ABSOLUTE factor 392), the printer processing instructions will commence an action to be performed automatically by the multifunction printer or an action in which the multifunction printer guides or instructs a user to perform a workflow task. In some examples, such guidance or instruction takes the form of an email, pop-up notification at a user interface of the multifunction printer, etc.

As further shown in FIG. 7B, in some examples, at least a part of the workflow W is automatically executed or triggered based on a relative time factor (RELATIVE factor 394) of temporal parameter 362 of type component 360 of a printer processing instruction. In some examples, the RELATIVE time factor includes a time period preceding, coinciding with, or following an event E (or an absolute time factor ATF). In one example, as shown in FIG. 7B, a printer processing instruction specifying a RELATIVE factor 394 for a temporal parameter 362 of the type component 360 (of a printer processing instruction) is executed or triggered upon an elapsed time period (ELAPSED TIME) following an event.

In some examples, aspects of the event parameter 364 and the temporal parameter 362 of the type component 360 of a printer processing instruction are combined or cooperate along generally the same portion of a workflow W or different portions of a workflow W.

In one example, the temporal parameter 362 of the type component 360 of a printer processing instruction leverages the operation of the scheduler 432 (FIG. 8) of the multifunction printer. In some examples, to facilitate a user performing a task that is part of the workflow, such as scanning a document possessed by the user, the printer processing instruction includes the action of sending an email to the user every fifteen minutes until/unless the user performs the requested workflow task. In this situation, the temporal parameter 364 of the type component 360 of a printer processing instruction 350 causes the multifunction printer to automatically perform actions to facilitate the work flow, such as tracking the time intervals via a scheduler of the multifunction printer to perform the action of monitoring the status of whether another action (e.g. scanning a document) was performed or not. In another aspect, this example illustrates how one of the resident functions (e.g. scheduler 432) of the multifunction printer is leveraged to deploy printer processing instructions.

In some examples, upon entry of the PPCD 10 to the multifunction printer 400 at the I/O PPCD filter 430 and in coordination with scheduler 432, each printer processing instruction is time stamped with its time of arrival. Via the temporal parameter 362 of type component 360, one of the printer processing instructions can specify an action that the multifunction printer notifies a workflow participant (via email or pop-up notification) within a certain time period (ELAPSED time) from the time of arrival of the PPCD 10. In some examples, the temporal parameter 362 of type component 360 also can be employed to specify an event as an elapsed time after an action (i.e. workflow task) performed by the workflow participant.

The examples described and illustrated in association with Figure are merely representative of a wide variety of ways to employ the temporal parameter 362 and/or event parameter 364 of a type component of a printer processing instruction in accordance with at least some examples of the present disclosure.

FIG. 10A is a block diagram schematically illustrating an action component 500 of printer processing instructions 358 (FIG. 6B), according to one example of the present disclosure. In general terms, as shown in FIG. 10A, the action component comprises a keyword reference 502 to invoke at least one application programming interface (API) 504 (of a plurality of application programming interfaces of the multifunction printer) to perform an action dictated by the printer processing instructions of the PPCD 10.

In some examples, a family of printer processing instructions include a closed library of a fixed number of keywords, which provides one aspect of security, as each action will have a corresponding unique keyword, and actors outside of workflow W will not have knowledge of those keywords. However, in some examples, some of the keywords include additional unnecessary characters or symbols to obscure the content of the keyword.

In some examples, keywords for an action component include keywords such as upload, store, send, sign, etc. In one aspect, a limited vocabulary (e.g. fixed set) of keywords is employed. In some examples, each keyword is related to a workflow task and/or resident function of the multifunction printer.

In some examples, the keyword is non-executable to ensure security of the action component and the printer processing instruction, as a whole. Moreover, the keyword is further secured via being a portion of the embedded, encrypted printer processing instructions (PPI).

In some examples, the action component forms part of a printer processing instruction without a specified type component (FIGS. 8A-8C). In some examples, the action component specifies an action in relation to or in response to a specified type per type component 360 (FIG. 8A).

As further shown in FIG. 10A, the action component 500 includes an array of application programming interfaces (API) 504. In one aspect, at least some of the respective application programming interfaces correspond to or define at least some of the resident functions of the multifunction printer. In some examples, at least some of the application programming interfaces include (but are not limited to) a transmit API 508, a storage API 510, a user interface API 412, end/or a job processing API 514.

In general terms, the transmit/receive API 508 includes (but is not limited to) functions which transmit or receive part of a PPCD 10 (or subparts of a document) or other information. Accordingly, in some examples, the transmit/receive API 508 includes functions or actions such as facsimile communications, email directly to/from the multifunction printer, data upload, etc.

In general terms, the storage API 510 includes (but is not limited to) functions or actions which relate to storage of parts or subparts of a PPCD. In some examples, the storage API 510 tracks, and/or controls, storage to disk, storage to a USB memory device, retrieval from memory, etc.

In general terms, the user interface API 512 includes (but is not limited to functions or actions which relate to the user interface(s) of the multifunction printer. Accordingly, in some examples, the user interface API 512 includes such functions or actions such as pop-up notifications of a control panel that request further information; indicate a status; confirm completion of an action; etc.

In general terms, the job processing API 514 includes (but is not limited to) functions or actions which relate to the job processing performed on some parts of the PPCD by the multifunction printer. Accordingly, in some examples, the job processing API 514 includes such functions or actions such as printing documents, scanning documents, appending or authorizing a digital signature for a part or the whole PPCD 10, etc.

In one example of the present disclosure, the at least partially automated workflow at the multifunction printer includes the action of applying a digital signature to a part of a PPCD 10. In this way, by incorporating the digital signature into the PPCD 10, a great deal of time and effort is saved as compared to traditional methods of obtaining signatures. In a traditional workflow, to obtain a signature the participant would print a part of document (e.g. word processing document), physically sign it with ink, and then scan the physically signed document. Sometimes, further additional steps of navigating directories and other commands follow the actual scanning.

However, via at least some examples of the present disclosure, the job processing API 514 enables directly applying a previously obtained digital signature (stored at the multifunction printer) to parts of the PPCD 10. This action saves numerous workflow steps because the document part need not be printed, need not be physically signed, and/or need not be scanned to become incorporated into the PPCD 10. Rather, in at least some examples, the printer processing instructions automate the workflow via directly and automatically retrieving the digital signature at the multifunction printer and apply it appropriately to the PPCD 10. Alternatively, the workflow is at least partially automated by sending a notification to a participant to apply the digital signature to the PPCD 10 at the multifunction printer.

FIG. 10B is a block diagram schematically illustrating a properties component 530 of printer processing instructions (FIG. 7), according to one example of the present disclosure. In general terms, as shown in FIG. 10B, the properties component 530 further specifies an aspect of the action component to establish the detailed logistics of executing the intended action in the workflow. In some examples, the properties component 530 of a printer processing instruction (PPI) includes (but is not limited to) a destination parameter 532 (e.g. location where to send a scanned document or signed document), a storage location parameter 534 (e.g. where a document is coming from or where a document is going to), a temporal parameter (e.g. when), display data selection parameter 538 (e.g. how or what to display), or a scan settings parameter 540 (what scan settings to implement). It will be understood that these parameters 532-540 are merely representative of the types of properties that can be specified for an action of a printer processing instruction.

FIG. 11 is a flow diagram 601 schematically illustrating a method 600 of at least partially automating workflow at and/or by a multifunction printer, according to one example of the present disclosure. In some examples, the method 600 is performed via the systems, modules, components, functions, etc. as previously described and illustrated in association with FIGS. 1-10B. In some examples, the method 600 is performed via systems, modules, components, functions, etc. other than those previously described and illustrated in association with FIGS. 1-10B.

In some examples, in a manner consistent with at least the description associated with FIG. 5A, the method 600 is stored as machine readable instructions within a non-transitory computer readable medium and that are generally executable by or on a processor of a multifunction printer.

In some examples, at 602 method 600 includes providing a publicly posted composite document (PPCD) that includes a plurality of parts, at least one map-file for each participant in a workflow associated with the publicly posted composite document, and a set of encryption keys associated with each one of the plurality of parts and distributed via the map file to the participants. In some examples, the set includes at least one of an encryption key, a decryption key, a signature key, and a verification key.

In one aspect, at least one of the parts of the PPCD includes printer processing instructions.

At 604, method 600 includes receiving the publicly posted composite document (PPCD) at the multifunction printer and enacting the printer processing instructions via at least one application programming interface of the multifunction printer to automate at least some steps of the workflow at the multifunction printer.

At least some examples of the present disclosure at least partially automate workflow at a multifunction printer by guiding a workflow participant through portions of the workflow and/or by the multifunction printer acting as a workflow participant to execute some of the actions that might otherwise ordinarily be performed by a human participant. In doing so, at least some examples of the present disclosure take advantage of the structure and security of publicly-posted composite documents (PPCDs) by embedding workflow processing instructions into the PPCDs.

At least some examples of the present disclosure dramatically decrease a participant's time spent at a multifunction printer to accomplish their assigned workflow tasks and/or dramatically increase the effectiveness of the overall workflow.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A multifunction printer comprising:
a processor; and
a memory on which is stored instructions that are to cause the processor to:
receive a publicly-posted composite document (PPCD), the PPCD including a plurality of parts, a respective map-file for each of a plurality of participants in a workflow associated with the PPCD, and a set of encryption keys associated with at least one of the plurality of parts and distributed via the map-files to the participants, the set including at least two of an encryption key, a decryption key, a signature key, and a verification key, wherein at least one of the parts, associated with the set of encryption keys, includes workflow processing instructions, and wherein the map-files identify differential access to the plurality of parts by the participants; and
enact the workflow processing instructions to automate at least some steps of the workflow for a participant of the plurality of participants at the multifunction printer via resident functions of the multifunction printer.

2. The multifunction printer of claim 1, wherein at least one part of the plurality of parts comprises a workflow print eligible part and at least one other part of the plurality of parts comprises a workflow print non-eligible part.

3. The multifunction printer of claim 2, wherein the workflow print eligible part includes at least one of a word processor part, a spreadsheet part, a slide presentation part, an image part, a hypertext markup language part, an AUTOCAD part, a portable document format part, a video part, or a portable audio file part.

4. The multifunction printer of claim 3, wherein the workflow processing instructions comprise a text identifier including an action component and a properties component.

5. The multifunction printer of claim 4, wherein the workflow processing instructions include a type component, which is further specified by the action component and the properties component, wherein the type component comprises at least one of an event-based parameter or a temporal parameter.

6. The multifunction printer of claim 5, wherein the temporal parameter of the type component comprises a parameter that is to trigger execution of at least some of the workflow processing instructions based on temporal factors.

7. The multifunction printer of claim 6, wherein the event-based parameter of the type component comprises a parameter that is to trigger execution of at least some of the workflow processing instructions upon an event associated with the PPCD at the multifunction printer.

8. The multifunction printer of claim 4, wherein the action component comprises a keyword reference to at least one application programming interface (API) of a plurality of application programming interfaces of the multifunction printer, and wherein at least some of the resident functions of the multifunction printer comprise at least some of the respective application programming interfaces.

9. The multifunction printer of claim 8, wherein the plurality of application programming interfaces includes at least one of a transmit/receive API, a storage API, a user interface API, or a job processing function.

10. The multifunction printer of claim 4, wherein the properties component further specifies an aspect of the action component according to at least one of a destination parameter, a location parameter, a temporal parameter, a display data selection parameter, or a scan settings parameter.

11. The multifunction printer of claim 1, wherein the workflow processing instructions, via their association with the encryption keys, are inseparable from the PPCD.

12. A non-transitory computer readable medium storing instructions, which when executed by a processor of a multifunction printer, are to cause to processor to:
provide a publicly posted composite document that includes a plurality of parts, a respective map-file for each of a plurality of participants in a workflow associated with the publicly posted composite document, and a set of encryption keys associated with at least one of the plurality of parts and distributed via the map-files to the participants, the set including at least one of an encryption key, a decryption key, a signature key, and a verification key, wherein at least one of the parts includes printer processing instructions, and wherein the map-files identify differential access to the plurality of parts by the participants; and enact the printer processing instructions via at least one application programming interface of the multifunction printer to automate at least some steps of the workflow at the multifunction printer.

13. The computer readable medium of claim 12, wherein the instructions are further to cause the processor to:

provide the publicly posted composite document to include, for each publicly posted composite document, a job identifier and a signature to ensure that execution is limited to authorized print jobs.

14. A document management system, comprising:

a composite document generation apparatus that generates a publicly posted composite document (PPCD), said PPCD including:

a plurality of parts comprising at least a first part including printer processing instructions enactable via a multifunction printer, wherein the printer processing instructions at least partially automate a workflow associated with the PPCD;

a respective map-file for each of a plurality of participants in the workflow, wherein the map-files identify differential access to the plurality of parts by the participants; and a set of encryption keys associated with at least the first part and distributed via the map-files to the participants, the set including at least one of an encryption key, a decryption key, a signature key, and a verification key; and a communication module to communicate the PPCD externally of the document management system for enactment of the printer processing instructions at the multifunction printer.

15. The document management system of claim 14, wherein the workflow processing instructions comprise a metadata structure defining at least a string including at least an action component that comprises a keyword reference to invoke at least one application programming interface (API) of a plurality of application programming interfaces of the multifunction printer to execute at least a portion of the workflow.

* * * * *